United States Patent
Lee et al.

(10) Patent No.: US 12,391,310 B2
(45) Date of Patent: Aug. 19, 2025

(54) STEERING CONTROL DEVICE AND METHOD

(71) Applicant: HL MANDO CORPORATION, Pyeongtaek-si (KR)

(72) Inventors: Jaewoo Lee, Gwangju-si (KR); Donghoon Shin, Seoul (KR)

(73) Assignee: HL MANDO CORPORATION, Pyeongtaek-si (KR)

(*) Notice: Subject to any disclaimer, the term of this patent is extended or adjusted under 35 U.S.C. 154(b) by 174 days.

(21) Appl. No.: 18/228,864

(22) Filed: Aug. 1, 2023

(65) Prior Publication Data
US 2024/0067264 A1 Feb. 29, 2024

(30) Foreign Application Priority Data
Aug. 24, 2022 (KR) .................. 10-2022-0106029

(51) Int. Cl.
*B62D 6/00* (2006.01)
(52) U.S. Cl.
CPC .................. *B62D 6/008* (2013.01)
(58) Field of Classification Search
CPC .... B62D 6/008; B62D 5/0481; B62D 5/0496; B62D 5/046
USPC ........................ 701/41, 42, 43, 44
See application file for complete search history.

(56) References Cited

U.S. PATENT DOCUMENTS

| | | | |
|---|---|---|---|
| 6,370,460 B1 * | 4/2002 | Kaufmann | B62D 6/008 340/576 |
| 6,929,086 B1 * | 8/2005 | Husain | B62D 5/003 180/413 |
| 6,976,555 B2 * | 12/2005 | Husain | B62D 5/003 180/443 |
| 8,554,418 B2 | 10/2013 | Kim | |
| 2011/0066330 A1 | 3/2011 | Kim | |
| 2017/0203786 A1 | 7/2017 | Min | |
| 2017/0267279 A1 | 9/2017 | Kim et al. | |

FOREIGN PATENT DOCUMENTS

| | | |
|---|---|---|
| CN | 107215385 B | 4/2020 |
| KR | 10-1285423 B1 | 7/2013 |
| KR | 10-2419464 B1 | 7/2022 |

OTHER PUBLICATIONS

Notice of Allowance dated Jun. 16, 2025 for corresponding Korean Patent Application No. 10-2022-0106029, along with an English machine translation (6 pages).

* cited by examiner

*Primary Examiner* — Hai H Huynh
(74) *Attorney, Agent, or Firm* — Hauptman Ham, LLP

(57) ABSTRACT

The present embodiments relate to a steering control device and method and may provide a steering control device and method capable of compensating for the effect on the increased friction level of the road wheel actuator (RWA) mechanism at a low temperature in a steer by wire (SBW) system. In particular, there may be provided a steering control device and method capable for compensating for heavy steering that the driver may feel at low temperature by determining a friction level at a low temperature while driving according to a preset compensation condition and compensating for rack force information with respect to the friction level.

20 Claims, 8 Drawing Sheets

FIG.6
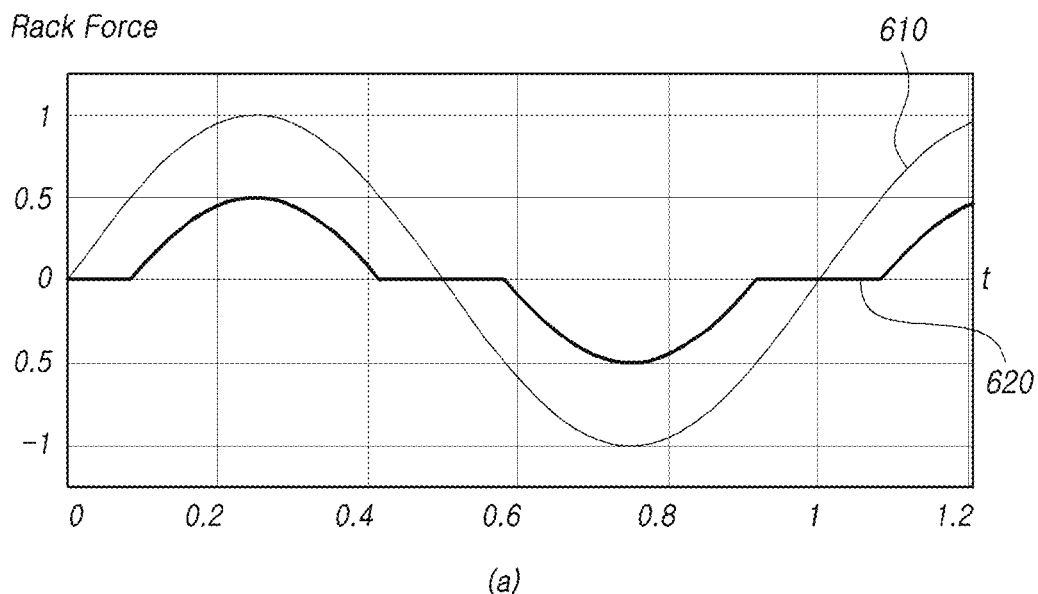
(a)
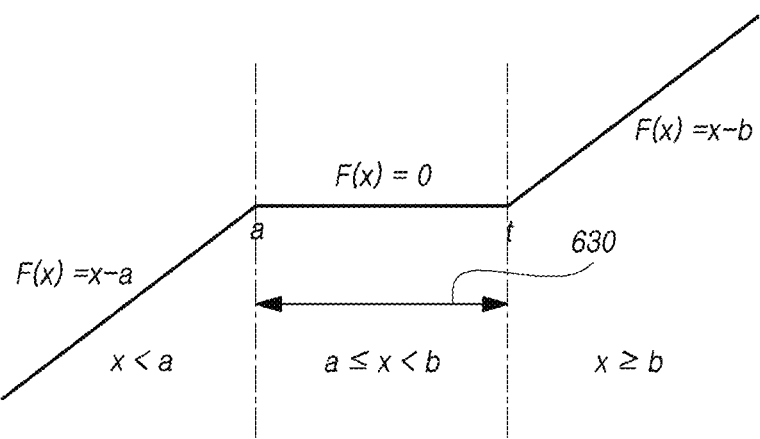
(b)

FIG. 7
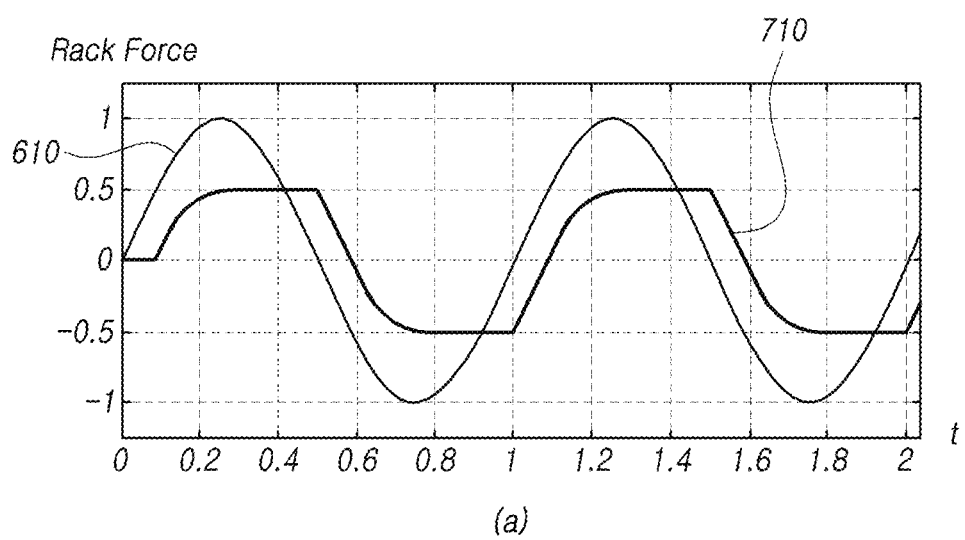
(a)
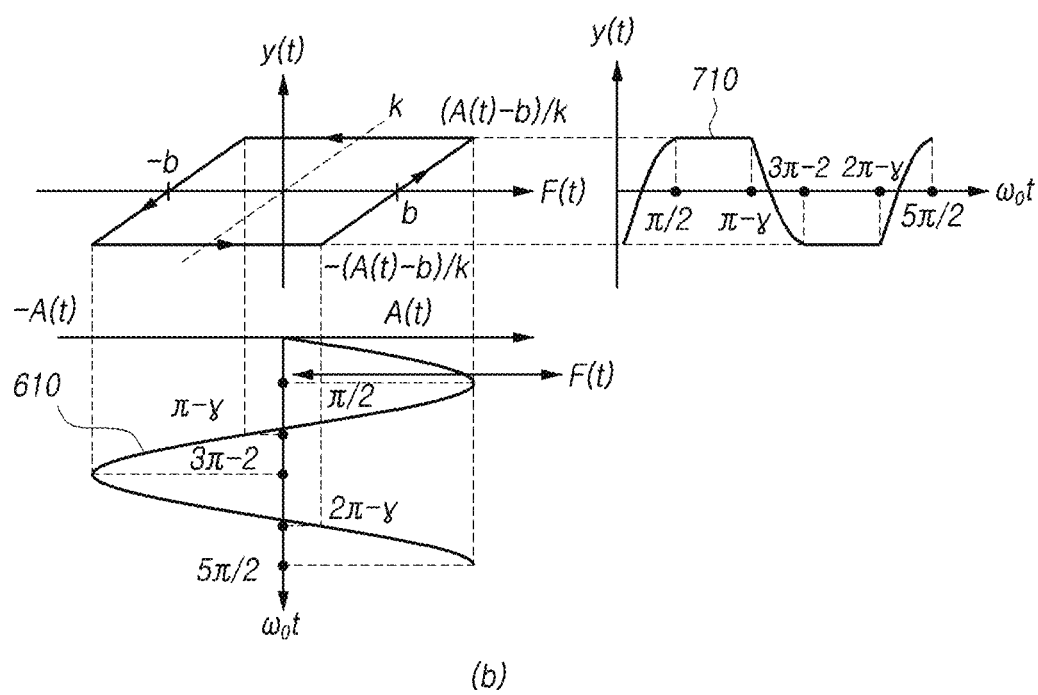
(b)

STEERING CONTROL DEVICE AND METHOD

CROSS-REFERENCE TO RELATED APPLICATION

This application claims priority from Korean Patent Application No. 10-2022-0106029, filed on Aug. 24, 2022, which is hereby incorporated by reference for all purposes as if fully set forth herein.

BACKGROUND

Field

The present embodiments relate to a steering control device and method.

Description of Related Art

The vehicle's steer by wire (SBW) system may be a system that allows the vehicle to be steered by an electric motor instead of removing mechanical linking devices, such as steering columns, universal joints, or pinion shafts between the steering wheel and wheels. Unlike general-purpose steering systems, the steer by wire (SBW) system may be composed of a steering feedback actuator (SFA) and a road wheel actuator (RWA). Further, the steer by wire (SBW) system needs to generate an appropriate steering reaction force from a motor installed on the steering wheel in order for the driver to have a similar sense of steering to that of the conventional steering system. Specifically, due to no mechanical linkage between the steering rack gear and the steering column, the steer by wire (SBW) system may estimate the rack force based on the signal from the road wheel actuator (RWA) and transmit it to the steering feedback actuator (SFA), transferring road information and vehicle status to the driver.

However, if the temperature changes in the steer by wire (SBW) system, the friction level of the road wheel actuator (RWA) mechanism may be varied. For example, in a low-temperature state, the friction level may rise due to a change in the physical property of the grease applied to, e.g., the bearings of the road wheel actuator (RWA) mechanism. In other words, in the steer by wire (SBW) system, as the friction level of the road wheel actuator (RWA) mechanism rises in a low-temperature state, the hysteresis of the rack force may increase, causing the driver to feel heavier steering than in a room-temperature state.

Therefore, the steer by wire (SBW) system requires a technique for compensating for the effect on the increased friction level of the road wheel actuator (RWA) mechanism at low temperature to prevent such an influence.

BRIEF SUMMARY

In the foregoing background, the present embodiments may provide a steering control device and method capable of compensating for the effect on the increased friction level of the road wheel actuator (RWA) mechanism at a low temperature in a steer by wire (SBW) system.

In an aspect, the present embodiments may provide a steering control device applied to a steer by wire (SBW) system of a vehicle, comprising a condition determinator configured to determine whether to apply compensation for friction generated in a mechanism of a road wheel actuator (RWA) in a low-temperature state based on printed circuit board (PCB) temperature information, rack position information, and rack speed information according to a preset compensation condition, a level determinator configured to determine a friction level based on the rack force information according to a result of the determination by the condition determinator, and a controller configured to convert the rack force information into final rack force information by compensating for the rack force information based on the determined friction level and control a steering feedback actuator (SFA) based on the final rack force information.

In another aspect, the present embodiments may provide a steering control method applied to a steer by wire (SBW) system of a vehicle, comprising determining whether to apply compensation for friction generated in a mechanism of a road wheel actuator (RWA) in a low-temperature state based on PCB temperature information, rack position information, and rack speed information according to a preset compensation condition, determining a friction level based on the rack force information according to a result of the determination of whether to apply the compensation, and converting the rack force information into final rack force information by compensating for the rack force information based on the determined friction level and controlling a steering feedback actuator (SFA) based on the final rack force information.

According to the present embodiments, there may be provided a steering control device and method capable of compensating for the effect on the increased friction level of the road wheel actuator (RWA) mechanism at a low temperature in a steer by wire (SBW) system.

DESCRIPTION OF DRAWINGS

The above and other objects, features, and advantages of the disclosure will be more clearly understood from the following detailed description, taken in conjunction with the accompanying drawings, in which:

FIGS. 6 and 7 are views illustrating an operation for changing into final rack force information by a controller of a steering control device according to an embodiment of the disclosure.

DETAILED DESCRIPTION

Figure 1:
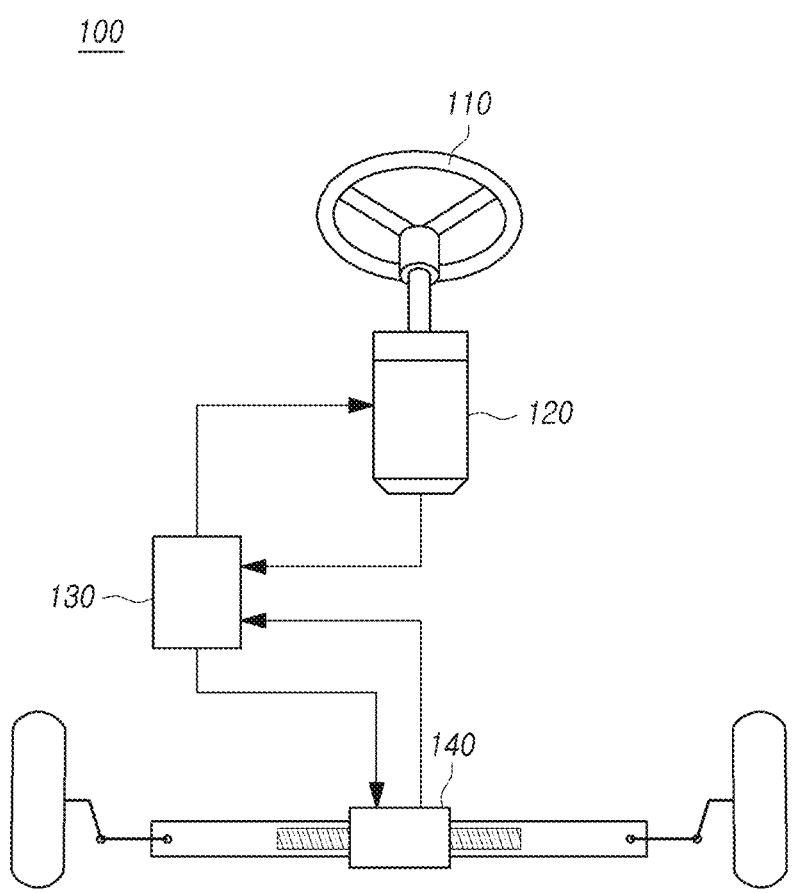
FIG. 1 is a view illustrating a chemical formula of a steer by wire (SBW) system to which a steering control device is applied according to an embodiment of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a view illustrating a chemical formula of a steer by wire (SBW) system to which a steering control device is applied according to an embodiment of the disclosure.

Referring to FIG. 1, an SBW system to which a steering control device according to an embodiment of the disclosure is applied may be described. For example, the steer by wire (SBW) system 100 may be a system in which there is no mechanical linkage between the steering wheel 110 and the rack 140, unlike an electronic power steering (EPS) system which is a conventional steering control system. For example, the upper end of the SBW system 100 may include a reaction force motor for applying a steering reaction force, and a steering feedback actuator including a steering torque sensor, a steering angle sensor, and the like mounted on the steering column. Further, the lower end of the SBW system 100 may include a road wheel actuator (RWA) including a steering driving motor or a driving actuator for driving a rack bar.

In other words, in the SBW system 100, a column connected to the steering wheel 110 may be coupled to the steering feedback actuator (SFA) 120 capable of applying a steering reaction force to the steering wheel 110. The rack 140 may be coupled to a road wheel actuator (RWA) 130 for controlling the front wheels. The steering feedback actuator 120 may be coupled with a reaction force motor for applying the steering reaction force, and the road wheel actuator 130 may be coupled with a steering driving motor for controlling the front wheel by moving the rack. Since the SBW system 100 does not have a mechanical linkage between the steering wheel 110 and the rack 140, although the rack gear receives an external force when the vehicle is steered, the force may not be transferred to the steering wheel. Accordingly, a separate steering reaction force generator may be required to provide the driver with a similar sense of steering to that of the EPS, which is the conventional steering control system having mechanical linkage, by generating an appropriate steering reaction force when the vehicle is steered. The steering reaction force or the steering reaction torque may be a force or torque applied to the steering wheel connected to the upper-end device according to the movement of the rack bar of the lower-end device in which actual steering is performed.

Specifically, due to no mechanical linkage between the steering wheel and the rack, the SBW system 100 may not use the steering reaction force calculation method used in the conventional EPS, and the steering reaction force generator of the SBW system 100 may need to control the steering feedback actuator by deriving the steering reaction force as a function of the rack force. Moreover, in the low-temperature state, as the friction level of the road wheel actuator (RWA) mechanism included in the SBW system 100 increases, the driver may feel heavier steering than in a room-temperature state. Accordingly, the SBW system 100 may need to compensate for the effect on the friction level that increases in the low-temperature state.

Figure 2:
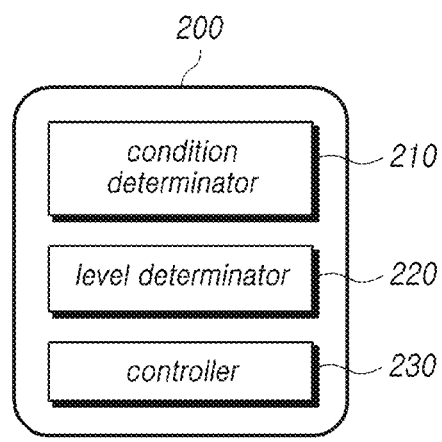
FIG. 2 is a view illustrating a configuration of a steering control device according to an embodiment of the disclosure.

FIG. 2 is a view illustrating a configuration of a steering control device according to an embodiment of the disclosure.

Referring to FIG. 2, a steering control device 200 according to an embodiment of the disclosure may include a condition determinator 210, a level determinator 220, and a controller 230. As an example, a steering control device 200 applied to a steer by wire (SBW) system of a vehicle may comprise a condition determinator 210 determining whether to apply compensation for friction generated in a mechanism of a road wheel actuator (RWA) in a low-temperature state based on printed circuit board (PCB) temperature information, rack position information, and rack speed information according to a preset compensation condition, a level determinator 220 determining a friction level based on the rack force information according to a result of the determination by the condition determinator, and a controller 230 converting the rack force information into final rack force information by compensating for the rack force information based on the determined friction level and controlling a steering feedback actuator (SFA) based on the final rack force information.

The condition determinator 210 of the steering control device 200 according to an embodiment may determine whether to apply compensation for friction occurring in the mechanism of the road wheel actuator (RWA) in the low-temperature state. For example, the condition determinator 210 may determine whether to apply compensation for friction occurring in the mechanism of the road wheel actuator in the low-temperature state based on the PCB temperature information, the rack position information, and the rack speed information according to a predetermined compensation condition. For example, the condition determinator 210 may sequentially determine a first compensation condition, a second compensation condition, and a third compensation condition included in the compensation condition. If all of the first compensation condition, the second compensation condition, and the third compensation condition are met, the condition determinator 210 may determine to apply compensation for friction. Here, it may be determined that the first compensation condition is that the PCB temperature information is less than or equal to a preset reference temperature. The second compensation condition may be determined when the first compensation condition is met, and it may be determined that the second compensation condition is that the absolute value of the rack position information is less than or equal to a preset reference position. The third compensation condition may be determined when the first compensation condition and the second compensation condition are met, and it may be determined that the third compensation condition is that the absolute value of the rack speed information is less than or equal to a preset reference speed.

The level determinator 220 of the steering control device 200 according to an embodiment may determine the friction level based on the rack force information according to the determination result of the condition determinator 210. For example, when it is determined to apply compensation for friction, the level determinator 220 may determine the friction level based on the rack force information. For example, the level determinator 220 may estimate a parameter through a recursive-least-squares algorithm using rack force information as an input and determine the estimated parameter as a friction level. Specifically, the level determinator 220 may compare the input rack force information calculated by the recursive-least-squares algorithm with the output rack force information calculated with the estimated parameter. In this case, the estimated parameter b may be determined as the friction level. In other words, the level determinator 220 may determine the friction level by estimating a parameter that is a specific coefficient of the polynomial based on the recursive-least-squares algorithm using the rack force information as an input.

The controller 230 of the steering control device 200 according to an embodiment may control the steering feedback actuator (SFA) based on the final rack force information where the compensation for friction has been applied according to the low temperature. For example, the controller 230 may compensate for the rack force information based on the determined friction level and convert the rack force information into final rack force information. The controller 230 may control the steering feedback actuator (SFA) based on the final rack force information. For example, the controller 230 may compare the friction level with a preset reference friction level to compensate for the rack force information only when the friction level is equal to or greater than the reference friction level. Here, the reference friction level may be calculated from rack force information estimated during a time corresponding to a compliance zone in the room-temperature state. Also, e.g., the controller 230 may compensate for the estimated rack force information to reduce the increased friction as the controller 230 becomes in the low-temperature state and convert the rack force information into the final rack force information. Further, the controller 230 may configure a friction compensator including at least one of a dead zone and a back lash based on the estimated rack force information and apply the friction compensator to convert the rack force information into the final rack force information. Specifically, the controller may set an arbitrary range as the dead zone based on the estimated rack force information, and convert into the final rack force information by lowering the estimated rack force information using the dead zone. Accordingly, the converted final rack force information may be that the set dead zone range is maintained as 0, and the other ranges are a value reduced by a predetermined size with respect to the estimated rack force information. However, the dead zone and the back lash are examples of the friction compensator, but are not limited thereto.

Figure 3:
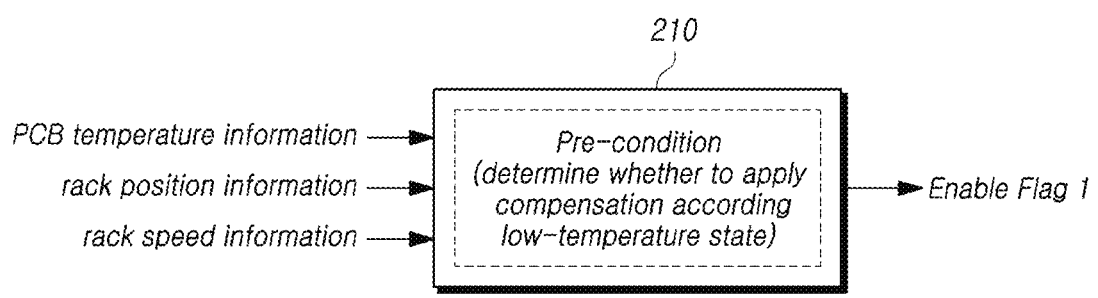
FIG. 3 is a view illustrating a condition determinator of a steering control device according to an embodiment of the disclosure.

FIG. 3 is a view illustrating a condition determinator of a steering control device according to an embodiment of the disclosure.

Referring to FIG. 3, the condition determinator 210 of the steering control device 200 according to an embodiment of the disclosure may determine whether to apply compensation according to a low-temperature state. For example, the condition determinator 210 may determine whether to apply compensation for friction occurring in the mechanism of the road wheel actuator in the low-temperature state based on the PCB temperature information, the rack position information, and the rack speed information according to the compensation condition. Here, the compensation condition may be a pre condition set to determine a friction level at a low temperature while driving using the PCB temperature information and the vehicle information measured by the sensor at room temperature and determine whether to apply compensation.

For example, the condition determinator 210 may receive and obtain sensing information from at least one of a steering angle sensor detecting a change in the rotation of the steering shaft that varies depending on manipulation of the driver's steering wheel 110, a torque sensor detecting the torque of the reaction force motor, a vehicle velocity sensor detecting the vehicle velocity, a rack position sensor installed on the rack bar to detect rack position information, and a motor position sensor of the reaction force motor, for the PCB temperature information, rack position information, and rack speed information. As a specific example, the condition determinator 210 may measure rack position information using the rack position sensor installed on the rack bar, and obtain rack speed information by differentiating the measured rack position information. Alternatively, the condition determinator 210 may measure rotation amount information about the motor using an encoder of the motor driving the rack bar, and obtain rack position information and rack speed information from the measured motor rotation amount information. As another specific example, the condition determinator 210 may obtain PCB temperature information from the controller using CAN communication.

Further, e.g., the condition determinator 210 may sequentially determine the measured PCB temperature information, rack position information, and rack speed information according to the first compensation condition, the second compensation condition, and the third compensation condition included in the compensation condition, and when all of the compensation conditions are met, determine to apply compensation for friction.

When the condition determinator 210 determines to apply compensation for the friction generated in the mechanism of the road wheel actuator in a low-temperature state according to the compensation condition, an enable flag 1 may be generated for applying a compensation logic. Accordingly, only when an enable flag is generated, the next operations of determining the friction level and compensating for rack force information may be performed. A detailed description of sequentially determining the compensation condition by the condition determinator 210 is made below with reference to FIG. 4.

Figure 4:
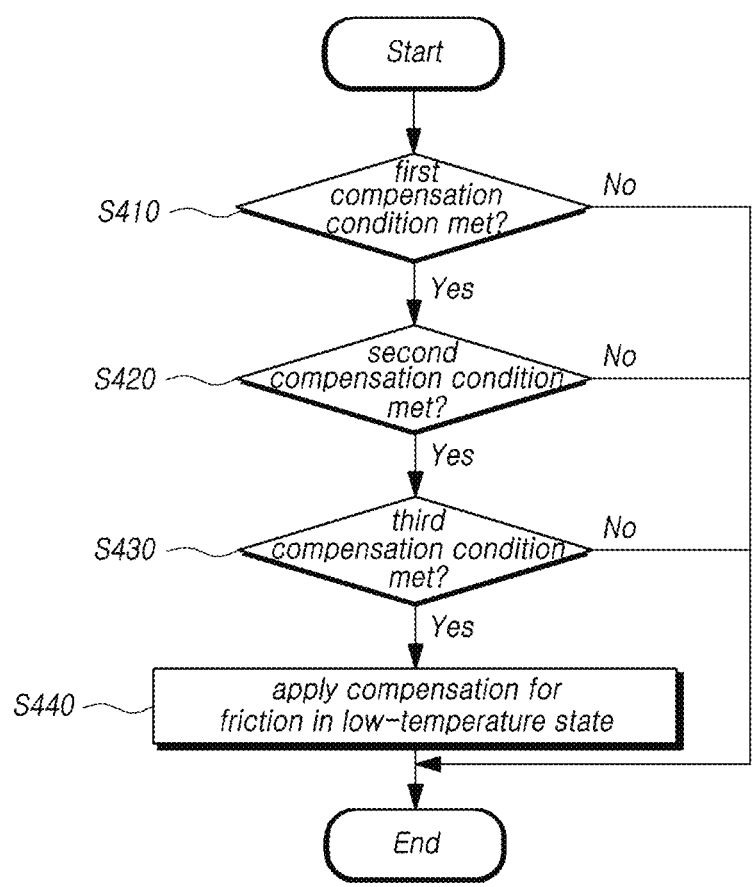
FIG. 4 is a flowchart illustrating an operation for determining whether a condition determinator of a steering control device applies compensation according to an embodiment of the disclosure.

FIG. 4 is a flowchart illustrating an operation for determining whether a condition determinator of a steering control device applies compensation according to an embodiment of the disclosure.

Referring to FIG. 4, an operation in which the condition determinator 210 of the steering control device 200 according to an embodiment of the disclosure determines whether to apply compensation for friction in a low-temperature state may be described. As an example, the condition determinator 210 of the steering control device 200 may determine whether the first compensation condition is met (S410). For example, the condition determinator 210 may determine that the first compensation condition is met if the PCB temperature information is a preset reference temperature or less. Here, the reference temperature may be set to a temperature at which the friction level occurring in the mechanism of the road wheel actuator rises as the temperature reduces so that the hysteresis of the rack force starts to increase. Specifically, the reference temperature may be preset to −10° C., but is not limited thereto as long as it is a temperature at which the friction level increases due to a change in the physical properties of the mechanism as the temperature decreases. In other words, when the PCB temperature information exceeds the predetermined reference temperature according to the first compensation condition, the condition determinator 210 may withhold application of compensation for friction. On the other hand, if the PCB temperature information is less than or equal to the predetermined reference temperature, the condition determinator 210 may determine that the first compensation condition is met and may thus determine the second compensation condition.

For example, if the first compensation condition is met, the condition determinator 210 of the steering control device 200 may determine whether the second compensation condition is met (S420). For example, if the first compensation condition is met, the condition determinator 210 may determine that the second compensation condition is met if the absolute value of the rack position information is less than or equal to a preset reference position. Here, the reference position may be set to a position for detecting compensation according to the low temperature. Specifically, the reference position may be preset in a small range of 1 mm, but is not limited thereto as long as it is a position that may be a reference for whether to apply compensation according to low temperature. Further, the condition determinator 210 may receive and obtain rack position information from a rack position sensor installed on the rack bar. The rack position information may be information measured in a tiny operation area to minimize the influence on other parts. In other words, if the absolute value of the rack position information exceeds the preset reference position according to the second compensation condition, the condition determinator 210 may withhold the application of compensation for friction. In contrast, if the absolute value of the rack position information is less than or equal to the preset reference position, the condition determinator 210 may determine that the second compensation condition is met and may thus determine the third compensation condition.

For example, if the first compensation condition and the second compensation condition are met, the condition determinator 210 of the steering control device 200 may determine whether the third compensation condition is met (S430). For example, when the first compensation condition and the second compensation condition are met, the condition determinator 210 may determine that the third compensation condition is met if the absolute value of the rack speed information is less than or equal to a preset reference speed. Here, the reference speed may be set to a speed at which compensation according to the low temperature is detected.

Specifically, the reference speed may be preset at a speed of 1 to 2 mm/s, but is not limited thereto as long as it is a speed that may be a reference for whether to apply compensation according to low temperature. Further, the condition determinator 210 may calculate and obtain it from the rack position information or the rotation amount information about the motor. The rack speed information may be information calculated from information measured in a tiny operation area to minimize the influence on other parts. In other words, if the absolute value of the rack speed information exceeds the preset reference speed according to the third compensation condition, the condition determinator 210 may withhold the application of compensation for friction. In contrast, if the absolute value of the rack speed information is less than or equal to the preset reference speed, the condition determinator 210 may determine that the third compensation condition is met and may thus determine to apply compensation for friction at low temperature.

As an example, if all of the first compensation condition, the second compensation condition, and the third compensation condition are met, the condition determinator 210 of the steering control device 200 may determine to apply compensation for friction according to low temperature (S430). For example, the condition determinator 210 generates enable flag 1 for applying a compensation logic if the PCB temperature information, rack position information, and rack speed information meet all of the preset compensation conditions. Here, the compensation logic may be a logic for determining a friction level based on a recursive-least-squares algorithm and compensating for rack force information estimated according to the friction level.

Figure 5:
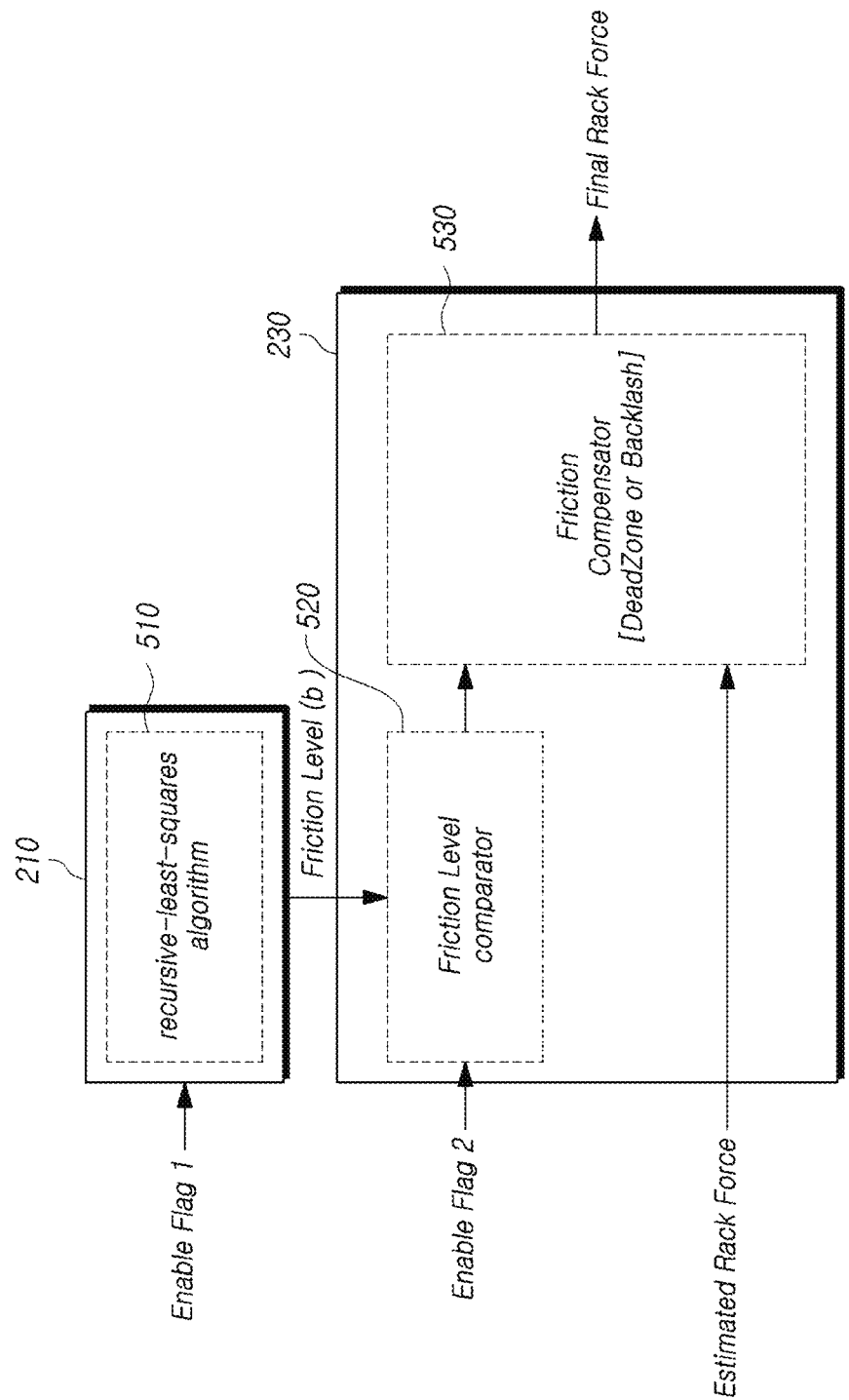
FIG. 5 is a view illustrating a level determinator and a controller of a steering control device according to an embodiment of the disclosure.

FIG. 5 is a view illustrating a level determinator and a controller of a steering control device according to an embodiment of the disclosure.

Referring to FIG. 5, an operation in which the level determinator 220 and the controller 230 of the steering control device 200 according to an embodiment of the disclosure determine a friction level and compensate for rack force information estimated according to the friction level may be described. For example, if all of the compensation conditions are met so that it is determined to apply compensation, the level determinator 220 of the steering control device 200 determines to apply compensation, the level determinator 220 may determine the friction level based on the rack force information. For example, if enable flag 1 is input, the level determinator 220 may determine the friction level using the recursive-least-squares algorithm 510. Further, the level determinator 220 may estimate a parameter of a system approximated by the recursive-least-squares algorithm 510 using the rack force information as an input. Here, the estimated parameter is parameter b corresponding to the friction level and may be a coefficient of a polynomial. In other words, the level determinator 220 may determine that the parameter b estimated in the recursive-least-squares algorithm 510 is the friction level.

Specifically, the recursive-least-squares algorithm 510 may be an adaptive filter algorithm that recursively finds the coefficient for minimizing the weighted linear least square cost function related to the input. The approximated system may be defined as:

$$z = Ax + b\,\text{sign}(y) \quad \text{[Equation 1]}$$

Here, x may be the rack position information, y may be the rack speed information, and z may be the rack force information. However, Equation 1 describes an example of the approximated system, and is not limited thereto.

Also, the recursive-least-squares algorithm may define a cost function as the sum of values obtained by multiplying an error by a weighting factor to estimate the parameter, and update the coefficient to minimize the sum. In this case, the error may be a difference between an actual value of the rack force information and an estimated value. The weighting factor is a forgetting factor, and may decrease the weight of the error in the previous nth step to increase the weight of the value that came in the last step.

The forgetting factor applied to the recursive-least-squares algorithm is a value that determines the estimated rate of change, and as it gets closer to 1, the rate of change may decrease. Further, the forgetting factor may require an appropriate value between 0 and 1 along with the initial values of the estimate and covariance for reasonable estimation. Accordingly, the level determinator 220 may compare the input rack force information calculated using the recursive-least-squares algorithm with the output rack force information calculated with the estimated parameter, and determine the estimated parameter as the friction level.

Also, as an example, the controller 230 of the steering control device 200 may compensate for the rack force information based on the determined friction level and convert the rack force information into final rack force information. For example, the controller 230 may determine whether to compensate for the rack force information using the friction level comparator 520. The friction level comparator 520 may be operated if an enable flag 2 is input as it corresponds to a low-temperature state. Accordingly, in the low-temperature state, the controller 230 may compare the determined friction level with a preset reference friction level and determine to compensate for the rack force information only if the friction level is greater than or equal to the reference friction level. Further, the reference friction level may be calculated from rack force information estimated during a time corresponding to a compliance zone in the room-temperature state. This may be because the friction level increases as the friction level changes from the room-temperature state to the low-temperature state.

Here, the rack force information is estimated based on the sensing information, and may mean the sum of the friction of the steering gear, the suspension friction of the host vehicle, and the reaction force of the tire. Specifically, the rack force information may be estimated by calculating rack speed information and rack acceleration information by performing first-order differentiation and second-order differentiation on the measured rack position information, and reflecting mass of the rack, damping of the rack, and stiffness of the rack. Further, the compliance zone may refer to a range in which the rack does not move even if the steering gear is driven. Specifically, the compliance zone may be set to a range in which the reaction force motor is rotated such that the rack does not move although the rack moves as the reaction force motor controlled by the command signal rotates.

As a specific example, the controller 230 may store the friction level calculated by operating a preset profile at room temperature in a non-volatile memory (NVM) area and use the friction level as a reference friction level. The controller 230 may determine whether to apply the friction compensator 530 based on the stored reference friction level. In other words, the controller 230 may compare the determined friction level with a preset reference friction level to apply the friction compensator 530 to compensate for the rack force information only when the friction level is equal to or greater than the reference friction level.

As another example, the controller 230 may input the estimated rack force information to the friction compensator 530 to convert the estimated rack force information into final rack force information. The controller 230 may compensate for the estimated rack force information to reduce the increased friction as it becomes a low temperature state and convert the rack force information into final rack force information. Details of the friction compensator 530 are described below with reference to FIG. 6.

FIG. 6 is a view illustrating an operation for changing into final rack force information by a controller of a steering control device according to an embodiment of the disclosure.

Referring to (a) and (b) of FIG. 6, an operation in which the controller 230 of the steering control device 200 according to an embodiment of the disclosure compensates for the rack force information 610 estimated using the dead zone and converts the rack force information 610 into final rack force information 620 may be described. For example, the controller 230 of the steering control device 200 may determine the final rack force information 620 to reduce the increased friction in the low-temperature state by applying the friction compensator 530 to the estimated rack force information 610. In this case, the friction compensator 530 may be set to include a dead zone 630. For example, the controller 230 may set the dead zone 630 to an arbitrary range based on the estimated rack force information 610, and may lower the estimated rack force information 610 using the dead zone to convert the rack force information 610 into the final rack force information 620. (a) of FIG. 6 illustrates rack force information 610 estimated before compensation and final rack force information 620 converted after compensation.

Specifically, the controller 230 may set the dead zone 630 to an arbitrary range based on the rack force information, and may convert the estimated rack force information to 0 in a range included in the dead zone 630. In contrast, in other ranges not included in the dead zone 630, the controller 230 may convert the estimated rack force information by increasing the estimated rack force information by a predetermined size. Referring to FIG. 6(b), the controller 230 may set a range in which the rack force information is greater than or equal to a and less than b as the dead zone 630. Further, the controller 230 may convert the final rack force information to 0 in the range set to the dead zone 630. In contrast, in the range where the rack force information is less than a, the controller 230 may convert the final rack force information to a value obtained by reducing the estimated rack force information by a. In the range where the rack force information is b or more, the controller 230 may convert the final rack force information to a value obtained by reducing the estimated rack force information by b. In general, a may be −b.

FIG. 7 is a view illustrating an operation for changing into final rack force information by a controller of a steering control device according to an embodiment of the disclosure.

Referring to (a) and (b) of FIG. 7, an operation in which the controller 230 of the steering control device 200 according to an embodiment of the disclosure compensates for the rack force information 610 estimated using the back lash and converts the rack force information 610 into final rack force information 710 may be described. For example, the controller 230 of the steering control device 200 may determine the final rack force information 710 to reduce the increased friction in the low-temperature state by applying the friction compensator 530 to the estimated rack force information 610. In this case, the friction compensator 530 may be set to include the back lash. For example, the controller 230 may apply a back lash effect to each range based on the estimated rack force information 610, thereby decreasing the estimated rack force information 610 and converting it into the final rack force information 710. (a) of FIG. 7 illustrates rack force information 610 estimated before compensation and final rack force information 710 converted after compensation.

Specifically, the controller 230 may output w(t) as the final rack force information 710 by applying the back lash to the rack force information 610 that is A sin (wt). w(t) may be expressed as in Equation 2.

$$w(t) = (A - b)k \quad \text{[Equation 2]}$$
$$\frac{\pi}{2} < wt \le \pi - \gamma$$
$$w(t) = (A\sin(wt) - b)k$$
$$\pi - \gamma < wt \le \frac{3\pi}{3}$$
$$w(t) = -(A - b)k$$
$$\frac{3\pi}{2} < wt \le 2\pi - \gamma$$
$$w(t) = (A\sin(wt) - b)k$$
$$2\pi - \gamma < wt \le \frac{5\pi}{2}$$
$$\text{where } \gamma = \sin^{-1}\left(1 - \frac{2b}{A}\right)$$

Here, b may be the size of back lash. Referring to (b) of FIG. 7, the controller 230 may convert into the final rack force information 710 as a value proportional to the value obtained by reducing the amplitude of the estimated rack force information 610 by the back lash size in an arbitrary range. The controller 230 may convert the final rack force information to a value proportional to the value obtained by decreasing the estimated rack force information 610 by b in any other ranges.

A steering control method that may be performed by the steering control device 200 described above in connection with FIGS. 1 to 7 is described below.

Figure 8:
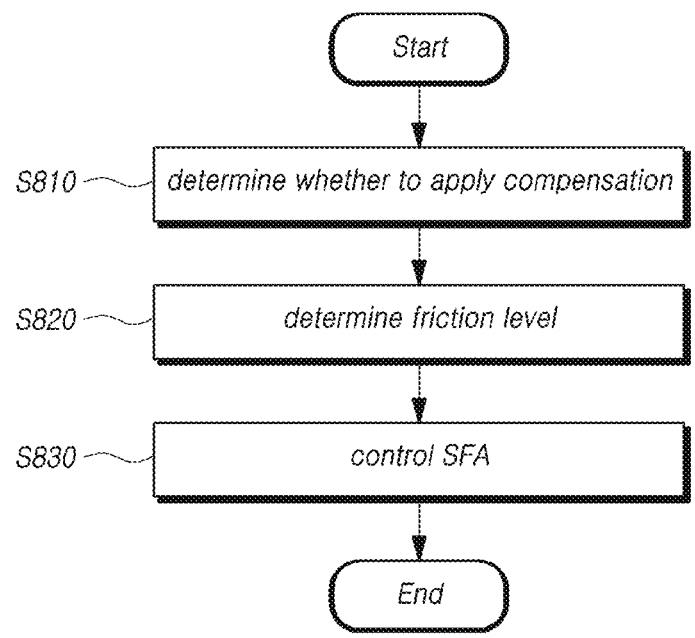
FIG. 8 is a flowchart illustrating a steering control method according to an embodiment of the disclosure.

FIG. 8 is a flowchart illustrating a steering control method according to an embodiment of the disclosure.

Referring to FIG. 8, a steering control method according to an embodiment of the disclosure may include a condition determination step (S810). As an example, the steering control device may determine whether to apply compensation for friction occurring in the mechanism of the road wheel actuator (RWA) in the low-temperature state. For example, the steering control device may determine whether to apply compensation for friction occurring in the mechanism of the road wheel actuator in the low-temperature state based on the PCB temperature information, the rack position information, and the rack speed information according to a predetermined compensation condition. Specifically, the steering control device may sequentially determine a first compensation condition, a second compensation condition, and a third compensation condition included in the compensation condition. If all of the first compensation condition, the second compensation condition, and the third compensation condition are met, the steering control device may determine to apply compensation for friction. Here, it may be determined that the first compensation condition is that the PCB temperature information is less than or equal to a preset reference temperature. The second compensation condition may be determined when the first compensation condition is met, and it may be determined that the second compensation condition is that the absolute value of the rack position information is less than or equal to a preset reference position. The third compensation condition may be determined when the first compensation condition and the second compensation condition are met, and it may be determined that the third compensation condition is that the absolute value of the rack speed information is less than or equal to a preset reference speed.

The steering control method according to an embodiment may include a level determination step (S820). As an example, the steering control device may determine the friction level based on rack force information depending on the result of determination of whether to apply compensation. For example, when it is determined to apply compensation for friction, the steering control device may determine the friction level based on the rack force information. Specifically, the steering control device may estimate a parameter through a recursive-least-squares algorithm using rack force information as an input and determine the estimated parameter as a friction level. The steering control device may compare the input rack force information calculated by the recursive-least-squares algorithm with the output rack force information calculated with the estimated parameter. In this case, the estimated parameter b may be determined as the friction level. In other words, the steering control device may determine the friction level by estimating a parameter that is a specific coefficient of the polynomial based on the recursive-least-squares algorithm using the rack force information as an input.

The steering control method according to an embodiment may include a control step (S830). As an example, the steering control device may control the steering feedback actuator (SFA) based on the final rack force information where the compensation for friction has been applied according to the low temperature. For example, the steering control device may compensate for the rack force information based on the determined friction level and convert the rack force information into final rack force information. The steering control device may control the steering feedback actuator (SFA) based on the final rack force information. Specifically, the steering control device may compare the friction level with a preset reference friction level to compensate for the rack force information only when the friction level is equal to or greater than the reference friction level. Here, the reference friction level may be calculated from rack force information estimated during a time corresponding to a compliance zone in the room-temperature state. Specifically, the steering control device may set an arbitrary section as the dead zone based on the estimated rack force information, and convert into the final rack force information by lowering the estimated rack force information using the dead zone. Specifically, the compliance zone may be set to a range in which the reaction force motor is rotated such that the rack does not move although the rack moves as the reaction force motor controlled by the command signal rotates.

As described above, according to the disclosure, there may be provided a steering control device and method capable of compensating for the effect on the increased friction level of the road wheel actuator (RWA) mechanism at a low temperature in a steer by wire (SBW) system. In particular, there may be provided a steering control device and method capable for compensating for heavy steering that the driver may feel at low temperature by determining a friction level at a low temperature while driving according to a preset compensation condition and compensating for rack force information with respect to the friction level.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A steering control device applied to a steer by wire (SBW) system of a vehicle, the steering control device comprising:
   a condition determinator configured to determine whether to apply compensation for friction generated in a mechanism of a road wheel actuator (RWA) in a low-temperature state based on printed circuit board (PCB) temperature information, rack position information, and rack speed information according to a preset compensation condition;
   a level determinator configured to determine a friction level based on the rack force information according to a result of the determination by the condition determinator; and
   a controller configured to convert the rack force information into final rack force information by compensating for the rack force information based on the determined friction level and control a steering feedback actuator (SFA) based on the final rack force information.

2. The steering control device of claim 1, wherein the condition determinator sequentially determines a first compensation condition, a second compensation condition, and a third compensation condition included in the compensation condition and,
   if all of the first compensation condition, the second compensation condition, and the third compensation condition are met, determines to apply the compensation for the friction.

3. The steering control device of claim 2, wherein the first compensation condition is that the PCB temperature information is a preset reference temperature or less.

4. The steering control device of claim 2, wherein the second compensation condition is determined when the first compensation condition is met and is that an absolute value of the rack position information is a preset reference position or less.

5. The steering control device of claim 2, wherein the third compensation condition is determined when the first compensation condition and the second compensation condition are met and is that an absolute value of the rack speed information is a preset reference speed or less.

6. The steering control device of claim 1, wherein the level determinator estimates a parameter through a recursive-least-squares algorithm using the rack force information as an input and determines that the parameter is the friction level.

7. The steering control device of claim 1, wherein the controller compares the friction level with a preset reference friction level to compensate for the rack force information only when the friction level is the reference friction level or more.

8. The steering control device of claim 7, wherein the reference friction level is calculated from rack force information estimated during a time corresponding to a compliance zone in a room-temperature state.

9. The steering control device of claim 7, wherein the controller converts the rack force information into the final rack force information by compensating for rack force information estimated to reduce friction increased according to the low-temperature state.

10. The steering control device of claim 9, wherein the controller configures a friction compensator including at least one of a dead zone and a back lash based on the estimated rack force information and applies the friction compensator to convert the rack force information into the final rack force information.

11. A steering control method applied to a steer by wire (SBW) system of a vehicle, the steering control method comprising:
    determining whether to apply compensation for friction generated in a mechanism of a road wheel actuator (RWA) in a low-temperature state based on PCB temperature information, rack position information, and rack speed information according to a preset compensation condition;
    determining a friction level based on the rack force information according to a result of the determination of whether to apply the compensation; and
    converting the rack force information into final rack force information by compensating for the rack force information based on the determined friction level and controlling a steering feedback actuator (SFA) based on the final rack force information.

12. The steering control method of claim 11, wherein the determining whether to apply compensation sequentially determines a first compensation condition, a second compensation condition, and a third compensation condition included in the compensation condition and,
    if all of the first compensation condition, the second compensation condition, and the third compensation condition are met, determines to apply the compensation for the friction.

13. The steering control method of claim 12, wherein the first compensation condition is that the PCB temperature information is a preset reference temperature or less.

14. The steering control method of claim 12, wherein the second compensation condition is determined when the first compensation condition is met and is that an absolute value of the rack position information is a preset reference position or less.

15. The steering control method of claim 12, wherein the third compensation condition is determined when the first compensation condition and the second compensation condition are met and is that an absolute value of the rack speed information is a preset reference speed or less.

16. The steering control method of claim 11, wherein the determining the friction level estimates a parameter through a recursive-least-squares algorithm using the rack force information as an input and determines that the parameter is the friction level.

17. The steering control method of claim 11, wherein the controlling the SFA compares the friction level with a preset reference friction level to compensate for the rack force information only when the friction level is the reference friction level or more.

18. The steering control method of claim 17, wherein the reference friction level is calculated from rack force information estimated during a time corresponding to a compliance zone in a room-temperature state.

19. The steering control method of claim 17, wherein the controlling the SFA converts the rack force information into the final rack force information by compensating for rack force information estimated to reduce friction increased according to the low-temperature state.

20. The steering control method of claim 19, wherein the controlling the SFA configures a friction compensator including at least one of a dead zone and a back lash based on the estimated rack force information and applies the friction compensator to convert the rack force information into the final rack force information.

* * * * *